United States Patent
Owens et al.

(10) Patent No.: US 6,673,870 B2
(45) Date of Patent: Jan. 6, 2004

(54) COMPOSITIONS OF POLYOLEFINS AND HYPERBRANCHED POLYMERS WITH IMPROVED TENSILE PROPERTIES

(75) Inventors: Blair Alex Owens, Chapel Hill, NC (US); Nancy Eckert Jackson, Cincinnati, OH (US); Dimitris Ioannis Collias, Mason, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 15 days.

(21) Appl. No.: 10/144,401

(22) Filed: May 13, 2002

(65) Prior Publication Data

US 2003/0212173 A1 Nov. 13, 2003

(51) Int. Cl.$^7$ .................. C08L 23/04; C08L 27/04; C08L 33/02; C08L 33/04; C08L 35/02
(52) U.S. Cl. .................. 525/191; 525/212; 525/213; 525/220; 525/221; 525/222; 525/240; 524/543; 524/547; 524/551; 524/556; 524/557; 524/570; 524/576; 524/773; 524/780; 524/783; 524/788
(58) Field of Search .................. 525/191, 212, 525/213, 220, 221, 222, 240; 524/543, 547, 551, 556, 557, 570, 576, 773, 780, 783, 788

(56) References Cited

U.S. PATENT DOCUMENTS

| 4,507,466 A | 3/1985 | Tomalia et al. |
| 4,558,120 A | 12/1985 | Tomalia et al. |
| 4,568,737 A | 2/1986 | Tomalia et al. |
| 4,587,329 A | 5/1986 | Tomalia et al. |
| 4,694,064 A | 9/1987 | Tomalia et al. |
| 5,418,301 A | 5/1995 | Hult et al. |
| 5,859,148 A | 1/1999 | Borggreve et al. |
| 5,998,565 A | 12/1999 | De Brabander-van den Berg et al. |

OTHER PUBLICATIONS

"Dendritic additives present advantages for thermoplastics," European Plastics News, Mar. 1999. p. 23.

"HYBRANE™ DSM's new dendrites polymers," (http://www.dsmna.com/dsmna.html) downloaded Nov. 15, 1999.

Ye Hong, J.J. Copper–White, and M.E. MacKay, "A novel processing aid for polymer extrusion: Rheology and processing of polyethylene and hyperbranched polymer blends," The Society of Rheology, Inc., J. Rheol. 43(3), May/Jun. 1999.

Bo Pettersson and Hakan Bjornbert, "Boltorn™ Dendritic Polymers as Thermoplastic Additives," Perstorp Specialty Chemicals, specfic date unknown but believed to be prior to May 13, 2002.

Bo Petersson, "Hyperbranched Polymers–13 Unique Design Tools For Multi Property Control In Resins And Coatings," Perstop Specialty Chemicals, specific date unknown but believed to be prior to May 13, 2002.

Kim, Y.H., and Webster, O., "Hyperbranched Polymers", Chapter 8, Star and Hyperbranched Polymers, Marcel Dekker, Inc., 1999, pp. 201–238.

Primary Examiner—Nathan M. Nutter
(74) Attorney, Agent, or Firm—Leonard W. Lewis

(57) ABSTRACT

A composition of polyolefin, ester additive, and hyperbranched polymer with improved tensile energy-to-break value compared to polyolefins wihtout the hyperbranched polymer. The concentration of the hyperbranched polymers can be between about 0.1% and about 10% by weight of the polyolefins. The polyolefins have a melt flow index of about 14 g/10 min or greater.

20 Claims, No Drawings

COMPOSITIONS OF POLYOLEFINS AND HYPERBRANCHED POLYMERS WITH IMPROVED TENSILE PROPERTIES

FIELD OF THE INVENTION

The present invention relates to the field of polymer compositions that comprise a mixture or blend of polyolefins and hyperbranched polymers. In particular, the present invention relates to such polyolefin-containing compositions that exhibit improved tensile energy-to-break due to the inclusion of hyperbranched polymer.

BACKGROUND OF THE INVENTION

The physical, mechanical, processing, and/or aesthetic properties of polymers can be improved or modified by the incorporation of additives into the polymers. The range of additives available is large and selection of a particular one can be governed by many variables, including type of improvement or modification desired, efficiency of improvement or modification, cost, and effect on processing. For example, mechanical properties of polymers commonly sought to be improved with additives include tensile energy-to-break, elongation-to-break, strength, stiffness, and impact resistance.

In general, additives that modify the mechanical properties of polymers include: 1) chemical additives that are miscible with the polymer; 2) particulate fillers; and 3) fibrous reinforcements.

A wide variety of chemical additives are known for incorporation into polymers. Chemical additives used to modify mechanical properties of the polymer include impact modifiers and plasticizers. Impact modifiers improve the impact strength of the polymer, as the name suggests. Examples include elastomers, such as rubber. Plasticizers are added to improve processability of the polymer melt and/or improve flexibility of the final product. Examples of plasticizers include esters of phthalates, adipates, and mellitates. However, they typically do not substantially increase the tensile strength of the final product. Another disadvantage of plasticizers is that they typically are relatively high volatility materials, and can vaporize in the presence of high temperatures (such as exposure to direct sunlight).

Examples of particulate fillers, often referred to simply as fillers or extenders, are mineral particles such as clay, calcium carbonate, talc, and silicates. Such fillers typically decrease the cost of the final polymer product, although they can increase the weight and can have deleterious effects on mechanical properties of the polymer, such as increased brittleness.

Examples of fibrous reinforcements are glass, carbon, boron, and aramid fibers. Fibrous reinforcements can increase mechanical properties of the polymer, such as tensile strength, however they must typically be used in relatively large amounts in order to achieve a substantial improvement in such mechanical properties. Fibrous reinforcements are commonly added at levels of up to about 60% by weight of the final product. Incorporating such large amounts of additives in polymers can result in significant drawbacks. For example, due to surface energy differences between fillers and polymers, complete dispersion of certain fillers can be difficult, thereby reducing mechanical properties of the composition. In addition, the fibers can cause significant rates of wear on processing equipment. Finally, the density of many fibrous reinforcements can be high compared to that of the polymer, thus adding weight to the final product.

A simple way to estimate the effectiveness of additives to polymers is to calculate the "strengthening ratio", which can be defined as the ratio of the percentage mechanical property improvement to the weight percent of additive in the polymer (total composition weight basis). For example, if the loading of glass fibers in polypropylene is 30% by weight, and the tensile strength of the polypropylene increases 50% as a result of addition of the filler, the tensile strengthening ratio is 1.67.

It would be desirable to significantly improve the tensile properties of polymers at low addition levels of additive. Polyolefins, as a class of structural polymers are very widely and commonly used and, accordingly, it would be desirable to provide to polyolefins significant improvements in tensile properties at low levels of additive. It is further desirable to identify additives to polymers that can improve tensile properties at tensile strengthening ratios significantly higher than that exemplified above.

SUMMARY OF THE INVENTION

The present invention provides a composition comprising a mixture of polyolefin and hyperbranched polymer, that can have an increased tensile energy-to-break value, versus otherwise similar polymer compositions not containing the hyperbranched polymer, at relatively low levels of addition of the hyperbranched polymer. The tensile energy-to-break value of the composition of the present invention can be at least about 15% greater than the tensile energy-to-break value of the polyolefin.

The composition hereof can comprise a mixture of: polyolefin polymer, having a melt flow index of about 14 g/10 min or greater; from about 0.1% to about 10%, by weight of the polyolefin polymer, of a hyperbranched polymer, wherein the hyperbranched polymer is not covalently bonded to the polyolefin polymer; and from about 0.01 % to about 5%, by weight of the polyolefin polymer, of an ester additive. The ester additive is a compound that is miscible with the polyolefin.

All documents cited herein are, in relevant part, incorporated herein by reference; the citation of any reference is not to be construed as an admission that it is prior art with respect to the present invention.

Notwithstanding the provision of any description or part thereof included in this specification describing the invention as "comprising" any step or element or any combination of steps or elements, the compositions and methods of the present invention can comprise, consist of, or consist essentially of the required elements and/or steps hereof as well as any combination of the required elements and/or steps in combination with any optional elements or steps disclosed herein.

All ranges of numerical values are inclusive of the values at the limits of the range unless otherwise expressly excluded.

DETAILED DESCRIPTION OF THE INVENTION

I. Definitions

As used herein, the term "polymer composition" refers to a composition containing at least one polymer and any additional additives or ingredients that may be present in said composition but excluding, unless otherwise specifically indicated, the hyperbranched polymers of the present invention.

The terms "blend" and "mixture" in reference to "polymers" refer to two or more polymers mixed together.

As used herein, the term "melt flow index" of a polymer refers to the polymer mass that can be extruded per unit time at a polymer-specific extrusion temperature (Te). For example, this extrusion temperature is 230° C. for polypropylene, and 190° C. for polyethylene. The index is measured according to the ASTM standard D 1238—95, and is reported in g/10 min. The value for the $T_e$ is that value listed for the specific polymer in the above ASTM standard or, if $T_{e\_}$ for the polymer is not listed, $T_e$ is calculated as $T_m$ (melt temperature) plus 60° C.

As used herein, the terms "energy-to-break" and "tensile energy-to-break" relate to the tensile energy absorbed by the polymer until its failure point (i.e., break point), and is equal to the area under the stress-strain curve (or equivalently, load-elongation curve) in tensile mode. As used herein, the terms "elongation-to-break" or "tensile elongation-to-break" are intended to refer to the tensile elongation of the polymer until its failure point. As used herein, the terms "maximum load" or "tensile maximum load" are intended to refer to the maximum load on the polymer during the tensile test. The tensile test to determine the above terms is conducted according to the ASTM standard D 638-96 Type V. The crosshead speed is 0.17 cm/s (4 in./min), and the tests are conducted without an extensometer. A statistically significant measurable increase in these tensile properties is considered an improvement.

As used herein, the term "hyperbranched polymer(s)" is intended to refer to polymer(s) or oligomer(s) that have highly branched, three-dimensional, tree-like structures, which can be characterized by having a "nucleus", one or more generations of branches, and an outermost generation of branches that terminate with end group functionalities. As used herein, "nucleus" refers to a central monomer from which branches extend.

As used herein, the term "nucleated" in the context of a "nucleated polymer" is intended to refer to polymers that possess crystallinity at least partially developed with the aid of nucleating agents. For example, a suitable nucleating agent for use herein includes, but is not limited to, sodium benzoate.

II. Blends of Polyolefins and Hyperbranched Polymers

Unexpectedly has been found that addition of hyperbranched polymer to certain polymer compositions comprising polyolefins can significantly improve tensile properties, such as the tensile energy-to-break and elongation-to-break, of the polyolefin polymer composition.

Polyolefins

Polyolefins are polymers, derived from olefins or which have olefinic character in their backbones. The polyolefins can be homopolymers, copolymers, and mixtures thereof. Examples of polyolefins can be polyethylene (PE), polypropylene (PP), polybutylene (PB1), polymethylpentene (PMP), and mixtures thereof. Examples of polyethylene can be low-density polyethylene (LDPE), high-density polyethylene (HDPE), linear low-density polyethylene (LLDPE), ultra high molecular weight Polyethylene (UHMWPE), metallocene polyethylene (mPE), cross-linked polyethylene (XLPE), ethylene-vinylacetate copolymer (EVA), ethylene-vinylalcohol copolymer (EVOH), ethylene ethylacrylate copolymer (EEA), ethylene methylacrylate copolymer (EMA), ethylene acrylic acid copolymers (EAA), ethylene methacrylic acid copolymer (EMAA), ionomer (IO), ethylene-propylene copolymer (P(E-P)), ethylene propylene rubber, chlorinated polyethylene (CPE), chlorosulfonated polyethylene (CSPE), and mixtures thereof. Examples of polypropylene can be homopolymer polypropylene, copolymer polypropylene, and mixtures thereof. Another examples of polypropylene can be metallocene, isotactic, syndiotactic, atactic, and mixtures thereof.

The polyolefin of the compositions hereof can be selected from the group consisting of polypropylene, polyethylene, polybutylene, polymethylpentene, and mixtures thereof. Preferably, the polyolefin of the blends can be selected from the group consisting of polyethylene, polypropylene, and mixtures thereof; more preferably the polyolefin of the blends can be polypropylene; and most preferably, the polyolefin of the blends can be nucleated polypropylene. The melt flow index of the polyolefin is preferably about 14 g/10 min or greater; more preferably, about 17 g/10 min or greater; and most preferably, about 20 g/10 min or greater. Without intending to be necessarily limited thereto, the melt flow index is typically no greater than about 50 g/10 min, more typically no greater than about 40 g/10 min.

Ester Additive

Typically, commercially produced polyolefin compositions contain additives, which serve various purposes as will be known to those skilled in the art. For example, additives include processing aids, colorants, lubricants, antistatic agents, anti-acid agents, nucleating agents, primary antioxidants, and secondary antioxidants.

Certain additives, including (but not limited to) antistatic and anti-acid agents, commonly incorporated into polyolefin polymer compositions have ester groups ("functionalities"). The "ester additive" for use in the present invention is intended to refer to compounds that contain at least one ester group and that are suitable for incorporation into, and miscible with, polyolefin polymer compositions.

The compositions of the present invention contain an ester additive. Examples of ester groups suitable for the ester additives include, but are not limited to, stearates, octanoates, distearates, isostearates, oleates, myristates, laureates, and palmitates. The ester additive of the present invention can be selected from the glyceryl esters, carboxylic acid esters including but not limited to fatty acid esters, metallic esters, and mixtures thereof. The typical chain of aliphatic portions of the above esters can be between about 4 and about 30 carbon atoms. Suitable metallic functionalities for the above metallic esters can comprise metals such as calcium, magnesium, sodium, potassium, zinc, and combinations thereof. Specific examples of suitable ester additives include glyceryl monostearate, calcium stearate, and mixtures thereof.

The concentration of the ester additive in the polyolefin polymer composition will generally be about 0.01%, by weight of the polyolefin, or greater; in another embodiment about 0.015% or greater; and in another embodiment about 0.02% or greater. Preferably, the concentration of the ester additive is about 5% by weight of the polyolefin or less; in another embodiment about 2% or less; and in another embodiment about 1% or less.

Hyperbranched Polymer

Hyperbranched polymers are three-dimensional, highly branched, oligomeric or polymeric molecules. Hyperbranched polymers can be monodispersed, meaning that all molecules have the same structure, repeat units, and molecular weight. Monodispersed hyperbranched polymers generally have regular and highly symmetric branching. Such monodispersed polymers can be referred to in the art as "dendrimers" or "dendritic" polymers.

Hyperbranched polymers can also be polyodispersed, meaning that the number of repeat units is not the same in all molecules. This results in a distribution of molecular weight between the various individual polyomeric chains within the composition. Furthermore, the polyodispersed hyperbranched polyomers have structures with branching that is neither regular nor highly symmetric, and may include linear segments. Polydispersed hyperbranched polyomers are sometimes referred to in the art as simply "hyperbranched" polymers. However, for the purposes of this specification, the general term "hyperbranched" shall refer to both polyodispersed and monodispersed hyperbranched polyomers and the qualifier "polydispersed" or "monodispersed" will be used when a specific type of hyperbranched polymer is intended to be referenced.

One general methodology for the production of hyperbranched polymers, especially useful for monodispersed hyperbranched polymers, involves polymerization in a stepwise manner of chain extender monomers and cycles of protection, coupling, and deprotection that yield a structurally homogeneous polymer with exponential growth in molecular weight and number of end group functionalities. Another general methodology, which is especially useful for polydispersed hyperbranched polymers, involves a single step direct polymerization utilizing carefully chosen monomers.

Hyperbranched polymers contain a nucleus monomer unit (also called a "nucleus", an initiator core molecule, or a "core"), one or more generations of branches derived from chain extender monomers, and end group functionalities at the terminal ends of any polymeric branches.

The nucleus is a monomer unit derived (via reaction with chain extender monomers as hereinafter described) from a polyfunctional, oligomerizable molecule, or "monomer". The nucleus can be derived from compounds, or monomer, represented by the formula $Y(A)_n$ wherein Y is carbon, an aliphatic group, an alicyclic group, a heterocyclic group, or an aromatic group. Y can be branched, unbranched, substituted, or unsubstituted, and typically will have from 1 to 24, preferably 1 to 15, carbon atoms. Aliphatic Y groups are preferably branched. Cyclic and aromatic groups will typically have from 4 to 9 carbon atoms, more typically from 4 to 6 carbon atoms. Hetero-rings can, for example, have N, S, or O hetero-atoms, most typically one hetero-atom.

Each functional group A, independently, can be a group with functionalities selected from the group consisting of hydroxyls, carboxyls, esters, aldehydes, ketones, amides, amines, nitrites, alkenyls, alkynyls, and combinations thereof, wherein aliphatic portions of the above functionalities can have, but are not necessarily limited to, 1 to 8, inclusive, carbon atoms and, in alternate embodiments, 1 to 6, or 1 to 4, inclusive, carbon atoms. When n is 1, A should be a functional group, e.g., amine, nitrile, etc., capable of reacting, either directly or upon further processing (such as hydrogenation; for example, hydrogenation of nitrites) with two or more other functional groups.

Generally, n will be an integer greater or equal to 2, more generally an integer from 2 to 4, inclusive.

The chain extender monomer units are monomers derived via reaction with the nucleus or other chain extender monomer units by the formula $Z(A_x)(B)$, wherein Z can be a carbon, an aliphatic group, an alicyclic group, a heterocyclic group, or an aromatic group, as defined above with respect to "Y". Z can be the same or different from Y for a particular hyperbranched polymer. "x" is an integer that refers to the number of A functional groups in the monomer and most generally is from 1 to 4, inclusive. However when x is 1, A must be a functional group capable of covalently reacting at more than one site or bond either directly, such as an amine (e.g., —$NH_2$) or indirectly, such as a nitrile (upon hydrogenation forms a functional group capable of covalently reacting at more than one site or bond). Each B independently can be selected from the group defined above for the A functional groups, and further represents a functional group that can covalently react with A. Thus, A and B are not the same functional group for any particular material. For example, A and B can be chosen to have opposite electro- or nucleo philicity. Thus, if A is relatively nucleophilic, a B that is chosen can be relatively electrophilic.

A shorthand nomenclature for hyperbranched polymers used in the art simply refers to the nucleus monomers as An and the chain extender monomers as $A_xB$.

To prepare a hyperbranched polymer, the periphery, or outermost portion, expands outward from the nucleus in a series of repetitive polymerization steps referred to as generations. With each generation, additional branches can be attached to the polymer's prior generation. As a result, each generation brings about an increase in the molecular weight, until growth of the branches is terminated. Growth of the hyperbranched polymer can be terminated by limiting the number of chain extenders (alternately, reacting all or substantially all of the unreacted chain extenders such that no significant amounts of unreacted chain extenders remain). The end group functionalities of the final hyperbranched molecule are the groups A of the chain extender. These end group functionalities can, optionally, be altered by reacting them with other reactants, after the growth of the hyperbranched molecule is terminated. Alternately, the hyperbranched polymer can be terminated introducing compounds with end-cap groups that react with A groups of previously reacted chain extenders, but do not contain additional A functional groups. Examples of such end-cap compounds can be represented by the general formula Y(B) wherein Y and B are as defined above and can be the same or different than the Y and B species present in the remainder of the material.

Typically, the first generation of branches is created when the functional groups A of the nucleus react with the functional groups B of the chain extenders $A_nB$ Thus, the first generation will contain end group functionalities A. The subsequent generation is created when the functional groups A of the previous generation are reacted with the functional groups B of the chain extenders $A_xB$. Again, this generation will contain end group functionalities A. Since each chain extender monomer has multiple functional end groups A, upon reaction with further chain extender monomers $A_xB$, a highly branched polymer is formed. The above reaction scheme continues until it is terminated.

The hyperbranched polymers hereof will have a number of generations of branches per molecule of at least 1, preferably at least 2, each branch comprising a chain extender monomer unit covalently bonded with chain extender monomer units of the previous generation. Although higher numbers of generations of branches per molecule are not excluded, the typical number of generations per molecule is about 12 or less; preferably about 10 or less; more preferably about 8 or less; and most preferably about 6 or less. For the purposes of this invention, the terms "number of generations of branches per molecule" and "average number of generations of branches per molecule" are synonymous and used interchangeably. The typical molecular weight of hyperbranched polymers is about 100 or more; preferably, the molecular weight is about 200 or more; more preferably, it is about 300 or more; and most preferably, it is about 1,000 or more. Typically, the molecular weight of hyperbranched polymers is about 1,000,000 or less; preferably, the molecular weight is about 300,000 or less; more preferably, it is about 100,000 or less; and most preferably, it is about 20,000 or less. For the purposes of this invention, the terms "molecular weight" and "number average molecular weight" are synonymous and used interchangeably.

The level of branching of hyperbranched polymers can further be described in terms of a "Branching Factor", $f_{br}$, which is equal to the mole fraction of fully branched monomers relative to all possible branching sites. Branching factors are discussed, for example, in STAR AND HYPERBRANCHED POLYMERS, ed. M. K. Mishra and S. Kobayashi, Marcel Dekker, Inc., 1999, Chapter 8 "Hyperbranched polyomers" Y. H. Kim and O. Webster, pp. 201–238. The branching factor can be calculated as:

$$f_{br}=(T+B)/N_0$$

wherein T is the mole fraction of monomers at the terminal position; L is the mole fraction of unbranched linear monomer units; B is the mole fraction of fully branched monomer units; and $N_0=T+B+L$. The branching factor of the hyperbranched polymers hereof will typically be about 0.5 or greater.

Collectively, the outermost branches of polymerized chain extender monomers can contain a large number of end group functionalities. Although, hyperbranched polymers typically contain end groups of one functionality, hyperbranched polymers of the compositions of the present invention can contain end groups of more than one functionality. This can be achieved when the chain extender molecules contain another functional group, in addition to the A and B functional groups referred to above, that does not interact with the A groups of the previous generation. The number of end group functionalities per molecule of the hyperbranched polymers of the blends of the present invention is about 4 or more; preferably, the number of end group functionalities is about 8 or more; more preferably, the number is about 16 or more; and most preferably, the number is about 32 or more. The number of end group functionalities per molecule of the hyperbranched polymers of the blends of the present invention is about 16,384 or less; preferably, the number is about 4,096 or less; more preferably, the number is about 1,024 or less; and most preferably, the number is about 256 or less.

The A and B functionalities, including the end groups, of the hyperbranched polymers in particular can be, but are not limited to, hydroxyls, aliphatic or aromatic carboxylic esters, unsaturated fatty acid esters, aliphatic or aromatic amines, acrylate esters, methacrylate esters, ethylene oxide, carboxylic acid trialkoxysilanes, nitriles, epoxies, allyethers, acid anhydrides, acid chlorides, aliphatic or aromatic amides, carboxyls, aliphatic or aromatic epoxides, halides, imines, aliphatic or aromatic isocyanates, sulfonics, thiols, groups containing silicon or phosphorus, acrylates, alkenyls (e.g., short chain C2–C6 alkenyls, such as vinyls), alkynyls (e.g. C2–C6 alkynyls), and urethanes. More particularly, the A group functionalities of the hyperbranched polymers, as well as preferred end group functionalities, of the hyperbranched polymers of the present invention can be selected from the group consisting of allylethers, hydroxyls (as used in this specification hydroxyl is understood to include alkoxy's, such as C1–C6 alkoxy), amines, nitriles, epoxies, esters, imines, and combinations thereof. More particularly, such A groups and end group functionalities are selected from the group consisting of hydroxyls, aliphatic amines, aromatic amines, nitriles, and acid anhydrides, and combinations thereof. Of the B functionalities, examples of preferred functional groups include hydroxyl, acrylic, aliphatic carboxyls, and aromatic carboxyls, and combinations thereof. As previously described, the particular combination of A and B groups chosen should react with one another to form stable covalent bonds. Therefore the combination of A and B groups chosen should have different electrophilicity or nucleophilicity.

Nucleus molecules of the hyperbranched polymers can include: diols, including aliphatic diols, cycloaliphatic diols, and aromatic diols; triols; tetrols; sugar alcohols, such as but not limited to sorbitol and mannitol; anyhydroenneaheptitol; erythritols such as di- and penta-pentaerythitols; alpha-alkylglucosides, examples include those with C1–C6 alkyl groups; alkoxoate polymers, for example with weight average molecular weight of 8000 or less, derived from alkylene oxides and an alcohol (such as the alcohols described above).

Diols include C2–C18 diols. The diols can be straight or branched. Epoxides can also be used, e.g., 1,2-[eopxides] epoxides have 2–18 carbon atoms. Cycloaliphatic diols include compounds with C5–C6 rings, and C1–C8 alkanols, such as cyclohexane dimethanol.

Aromatic diols include 1,4-xylylene glycol and 1-phenyl-1,2-ethanediol, as well as reaction products of polyfunctional phenolic compounds with alkylene oxides or derivatives thereof. Bisphenol A is an example of a phenolic compound.

Diols of the ester type include, for example, neopentyl-hydroxypivalate.

Triols include those with the formula $R—C(CH_2OH)_3$ where R is $C_nH_{2n+1}$ and n is less than or equal to 24. R can be branched or straight chain.

Tetrols include pentaerythritol, ditrimethylolpropane, diclycerol, and ditrimethylolethane. It is also possible to use cycloaliphatic and aromatic tetrols as well as corresponding adducts with alylene oxides or derivatives thereof.

An example of a chain extender $Z(A_2)B$, or simply $A_2B$, is 2,2-dimethylolpropionic acid $(COOH)C(CH_3)(CH_2OH)_2$, where $Z=C(CH_3)(CH_2-)_2$, B=—COOH, each A=–OH and x=2. Other examples of chain extenders include Nonfunctional carboxylic acids having at least two hydroxyl groups, including but not limited to those having or at least two hydroxyalkyl groups, or a combination thereof.

The above acids can have, but are not limited to, propionic, butyric, acetic, and other C2–C12 acids, as well as aromatic acids such as phenyl carboxylic acids, having at least two hydroxyls (or hydroxylalkyls, or a combination thereof) pendant to the ring.

The highly branched structure of the hyperbranched polymers can be, but are not limited to, those derived from chain extenders to provide, subsequent to reaction to form the hyperbranched polymer, aromatic polyalkylene, polyalkylene, polyalkylene imine, polyarylene, polyaryl acetylene, polyamide, polyamido amine, polyester, polyether, polyether amide, polyester amide, polyetherketone, polythioether, and mixtures thereof.

Preferably, the highly branched structure of the hyperbranched polymers of the blends of the present invention can be selected from the groups consisting of polyester, polypropylene imine, polyesteramide, polyamido amine, polyamide, and mixtures thereof. More specifically, the highly branched structure of the hyperbranched polymers of the present invention can be selected from the groups consisting of polyester, polypropylene imine, polyesteramide, polyamido amine, and mixtures thereof. Most preferably, the highly branched structure of the hyperbranched polymers of the blends of the present invention can be selected from the groups consisting of polyester, polypropylene imine, polyesteramide, and mixtures thereof.

U.S. Pat. Nos. 5,859,148, 5,418,301, 4,507,466, 4,558,120, 4,568,737, 4,587,329, and 4,694,064 show examples of hyperbranched polymers, nucleus or core molecules, chain extenders, and methods of making hyperbranched polymers. Commercially available hyperbranched polymers include STARBURST® (from Dendritic Inc., Midland, Mich.), BOLTORN® (from Perstorp AB, Perstorp, Sweden), and HYBRANE® and ASTRAMOL® (from DSM N.V., Geleen, the Netherlands).

The STARBURST® polymers are monodispersed poly (amido) amines or polyethyleneimines. In the case of poly (amido) amines, the core molecule is a triamine, comprising amine A functionalities (derived by reacting ammonia with methyl acrylate and ethylene diamine), and the chain extender has amine A functionalities and an acrylate B functionality, derived by reacting ethylene diamine and a methyl acrylate. In the case of polyethylene imine, the core molecule is tris-(2-aminoethyl)amine, and the chain extender is an aziridine (e.g. N-tosyl-aziridine or N-mesylaziridine). In both cases, the end group, "A", functionalities are amines.

The BOLTORN® polymers are polydispersed aliphatic polyesters with pentaerythritol or trimethylolpropane as the core molecule. The chain extender is 2,2-dimethylolpropionic acid, with the A group, and end group functionality, being hydroxyl. Other end group functionalities can also be prepared by reacting the hydroxyl groups to yield epoxy or allylether functionalities.

The HYBRANE® polymers are polydispersed polyesteramides with an anhydride as the core molecule. Examples of anhydrides used are glutaric, succinic, hexahydrophthalic, and phthalic anhydrides. The chain extender is diisopropanolamine, with the end group functionality being hydroxyl. Other end group functionalities can also be prepared by reacting the hydroxyl groups to yield aliphatic or aromatic carboxyl esters, unsaturated fatty acid esters, tertiary amines, acrylate or methacrylate esters, carboxylic acid trialkoxysilanes, and propylene oxides.

The ASTRAMOL® polymers are monodispersed poly (propylene) imines with diaminobutane $NH_2(CH_2)_4NH_2$ as the core molecule. The chain extender is acrylonitrile $CH_2$=CHCN, and the reaction is followed by hydrogenation of the nitrile groups to primary amine groups. The end group functionalities are nitrile groups, if the end groups of the final generation are not hydrogenated, or amine groups, if the end groups of the final generation are hydrogenated.

The hyperbranched polymer should be used at a concentration that is effective for increasing the tensile energy to break of composition versus the tensile energy at break of the same composition without the hyperbranched polymer. Furthermore, the hyperbranched polymers of the present invention should not be covalently bonded to the polyolefins. The concentration of the hyperbranched polymers in the blends of the present invention is measured by weight of the polyolefin polymers. The typical concentration of the hyperbranched polymers in the blends of the present invention is about 0.05% or greater, by weight of he polyolefin polymer; in alternate embodiments the concentration can be about 0.1% or greater; or about 0.5% or greater; or about 1% or greater. The typical concentration of the hyperbranched polymers in the blends of the present invention is about 40% or less; in alternate embodiments it can be about 10% or less; or about 5% or less; or about 3% or less.

The use of hyperbranched polymers in the present invention can provide substantial improvements in the tensile energy-to-break. As will be understood by those skilled in the art, the precise level of improvement that is optimal will depend upon the particular application. Additionally the precise amount of hyperbranched polymer that should be added to achieve a particular level of improvement will depend upon the polyolefin and the hyperbranched polymer, as well as the ester additive. However, without limiting the invention thereto, the blends of the present invention can exhibit a tensile energy-to-break value greater than the tensile energy-to-break value of the polyolefin polymer by up to, or beyond, 500%; typically the tensile energy-to-break value is greater than the tensile energy-to-break value of the conventional polyolefin polymer composition by up to about 350%; and in other alternative embodiments by up to about 250%. In some embodiments of the present invention, the tensile energy-to-break value is greater than the tensile energy-to-break value of the polyolefin by about 15% or greater; preferably, it is greater by about 25% or greater; and more preferably, it is greater by about 40% or greater. In general, the polyolefin utilized for determining the base tensile energy-to-break value is the polyolefin composition used herein to form the blend but not including the hyperbranched polymer. Alternately, the polymer utilized for comparison can be the polyolefin polymer without any additives.

The compositions of the present invention can be prepared according to any one of a number of known additive incorporation processes. In general, the components of the present invention are provided in the form of a mixture. One skilled in the art will choose whichever method best suits their needs. Suitable methods include mechanical melt mixing of the hyperbranched polymer with the polyolefins, or dissolving the hyperbranched polymer in olefin monomer, and then initiating polymerization of the monomer for form the polyolefin. The composition can alternatively be prepared by mechanical melt mixing of the hyperbranched polymer and polyolefins using a twin-screw extruder heated above the melt temperature of the polyolefins.

The blends of the present invention can be processed using any suitable polymer processing methods and equipment to form a polymer product. For example, and not by way of limitation, the mixture can be processed in accordance with conventional polymer processing methods (e.g., extrusion, injection molding, blow bolding, film and/or sheet forming, fiber-forming, spraying, gravure roll printing, etc.). For further example, and not by way of limitation, the blends can be processed to yield polymer products such as fibers, films, sheets, pellets, plastic parts (e.g., including but not limited to injection molded plastic parts), and bottles (including but not limited to blow molded bottles). Also, the blends can be mixed with other additives. For example, and not by way of limitation, the blends can be mixed with colorants, fillers, and fibrous or other reinforcements.

In one embodiment of the present invention, the blend comprises a polyolefin composition and a hyperbranched polymer. The polyolefin composition has a melt flow index of about 14 g/10 min or greater, and includes between about 0.01% and 5%, by weight of the polyolefin, of an ester additive. The hyperbranched polymer concentration is between about 0.1% and about 10%, by weight of the polyolefin. The hyperbranched polymer is not covalently bonded to the polyolefin. The blend has a tensile energy-to-break value at least about 15% greater than the tensile energy-to break value of the plain polyolefin. As used herein, "plain polyolefin" refers to the polyolefin composition used in the present invention, containing any ester additive that may be present, but excluding the hyperbranched polymer.

In another embodiment of the present invention, the polyolefin composition has a melt flow index of about 17 g/10 min or greater, and includes between about 0.015% and 2%, by weight of the polyolefin, of an ester additive. The hyperbranched polymer concentration is between about 0.5% and about 5% by weight of the polyolefin. The hyperbranched polymer is not covalently bonded to the polyolefin. The blend has a tensile energy-to-break value at least about 50% greater than the tensile energy-to break value of the plain polyolefin.

In yet another embodiment of the present invention, the blend comprises a nucleated polypropylene and a hyperbranched polymer. The polypropylene has a melt flow index of about 20 g/10 min, and between about 0.1% and about 5%, by weight of the polyolefin, of a glyceryl monostearate additive. The hyperbranched polymer concentration is about 1% by weight of the nucleated polypropylene, its molecular weight can be about 5,100, and its molecule contains 64 hydroxyl end group functionalities. The hyperbranched polymer is not covalently bonded to the nucleated polypropylene. The blend has a tensile energy-to-break value at least about 100% greater than the tensile energy-to break value of the nucleated polypropylene.

In yet still another embodiment of the present invention, the blend comprises a polyethylene and a hyperbranched polymer. The polyethylene has a melt flow index of about 20 g/10 min, and between about 0.01% and about 5%, by weight of the polyolefin, of an ester additive. The hyperbranched polymer concentration is about 1% by weight of the polyethylene, its molecular weight can be about 5,100, and its molecule contains 64 hydroxyl end group functionalities. The hyperbranched polymer is not covalently bonded to the polyethylene. The blend has a tensile energy-to-break value at least about 40% greater than the tensile energy-to break value of the plain polyethylene.

EXAMPLE 1

The homopolymer polypropylene 5B04Z (Huntsman Corp.; Longview, Tex.), serving as a control, is extruded using the Werner & Pfleiderer ZSK-30 twin-screw extruder (Werner & Pfleiderer Corp., Ramsey, N.J.) with standard mixing screws. This polypropylene is nucleated, its melt flow index can be 20 g/10 min, and contains between 0.1% and 5% stearate-type antistatic additives. The extruder has 7 heated zones leading to a cold circulating water tank and a pelletizer. The extruder zones is set as follows: zone 1 at 215° C., zone 2 at 220° C., zone 3 at 225° C., zone 4 at 220° C., zone 6 at 215° C., and zone 7 at 210° C. The polymer is fed into the extruder feed section using a loading hopper with a single screw at a rate about 55% of its maximum. The twin-screw extruder screws is operated between 250–285 rpm, resulting in a torque about 60% of the extruder maximum when the polymer can be processed. The extruded polypropylene is then passed through the cold circulating water bath, pelletized and collected.

Small test bars injection molded using a 60-ton Engel injection molder with a 25 mm screw and a 2.22 oz shot size capacity. The process parameters are set as follows: melt temperature –107° C., temperature of water in the mold –27° C., temperature of water out of the mold –28° C., injection time –0.44 s, hold time –12 s, hold pressure –55 MPa, peak hydraulic machine pressure –74.5 MPa, and cool time –6 s.

Tensile tests are performed using an Instron Model 1122 tensile tester (Instron Inc.; Canton, Mass.) according to the ASTM D 638-96 standard Type V. Results that can be attained: the elongation-to-break can be 198%, maximum load can be 164.6 N (37 lb$_f$), and energy-to-break can be 5.4 J (47.6 lb$_f$·in.).

EXAMPLE 2

The 5B04Z polypropylene pellets are thoroughly dry mixed in a bucket with 1% by weight of the hyperbranched polymer BOLTORN® U1 (Perstorp AB), which contains 14 allylether end group functionalities, and has a molecular weight of about 8,000. The mixture is then processed, via extrusion and injection molding, and tested according to the conditions and parameters of Example 1. Results obtainable: the elongation-to-break is 414%, maximum load is 173.0 N (38.9 lb$_f$), and energy-to-break is 12.9 J (114.5 lb$_f$·in.). This blend exhibits 109% increase in elongation-to-break, 5% increase in maximum load, and 139% increase in energy-to-break, compared to the plain polypropylene 5B04Z. Results that can be obtained are also summarized in Table 1.

EXAMPLE 3

The 5B04Z polypropylene pellets are thoroughly dry mixed in a bucket with 1% by weight of the hyperbranched polymer BOLTORN® H40 (Perstorp AB), which contains 64 hydroxyl end group functionalities, and has a molecular weight of about 5,100. The mixture is then processed, via extrusion and injection molding, and tested according to the conditions and parameters of Example 1. The elongation-to-break is 474%, maximum load is 181.9 N (40.9 lb$_f$), and energy-to-break is 15.2 J (134.2 lb$_f$·in.). This blend exhibits 139% increase in elongation-to-break, 10.5% increase in maximum load, and 181 % increase in energy-to-break, compared to the plain polypropylene 5B04Z. Results that can be obtained are also summarized in Table 1.

TABLE 1

| Composition | Example # | Elongation-to-break (%) | Maximum Load (N) | Energy-to-break (J) |
|---|---|---|---|---|
| Plain PP: 5B04Z | 1 | 198 | 164.6 | 5.4 |
| Plain PP + 1% BOLTORN ® U1 | 2 | 414 | 173.0 | 12.9 |
| Difference from plain PP | | +109% | +5% | +139% |
| Strengthening ratio | | 109 | 5 | 139 |
| Plain PP + 1% BOLTORN ® H40 | 3 | 474 | 181.9 | 15.2 |
| Difference from plain PP | | +139% | +10.5% | +181% |
| Strengthening ratio | | 139 | 10.5 | 181 |

EXAMPLE 4

The polypropylene for this Example is the homopolymer polypropylene P4C5N-046 (Hunstman Corp.), serving as a control. This polypropylene is nucleated, its melt flow index is 20 g/10 min, and contains no stearate additives. The polymer is processed similarly to Example 1, and then tested according to the conditions and parameters of Example 1. The elongation-to-break is 362%, maximum load is 118.8 N (26.7 lb$_f$), and energy-to-break is 11.4 J (100.6 lb$_f$·in.). Results that can be obtained are also summarized in Table 2.

EXAMPLE 5

The P4C5N-046 polypropylene pellets can be thoroughly dry mixed in a bucket with 1% by weight of the hyperbranched polymer BOLTORN® H40 (Perstorp AB), which contains 64 hydroxyl end group functionalities, and has a molecular weight of about 5,100. The mixture is then processed, and tested according to the conditions and parameters of Example 4. The elongation-to-break is 332%, maximum load is 97.9 N (22.0 lb$_f$), and energy-to-break is 10.4 J (91.8 lb$_f$·in.). This blend exhibits 8.3% decrease in elongation-to-break, 17.6% decrease in maximum load, and 8.8% decrease in energy-to-break, compared to the plain polypropylene P4C5N-046. Results that can be obtained are also summarized in Table 2.

TABLE 2

| Composition | Example # | Elongation-to-break (%) | Maximum Load (N) | Energy-to-break (J) |
| --- | --- | --- | --- | --- |
| Plain PP: P4C5N-046 | 4 | 362 | 118.8 | 11.4 |
| Plain PP + 1% BOLTORN H40 | 5 | 332 | 97.9 | 10.4 |
| Difference from plain PP | | −8.3% | −17.6% | −8.8% |
| Strengthening ratio | | −8.3 | −17.6 | −8.8 |

EXAMPLE 6

The polypropylene for this Example is the homopolymer polypropylene P4C5B-076 (Huntsman Corp.), serving as a control. This polypropylene is nucleated, its melt flow index is 20 g/10 min, and contains between 0.1% and 5% stearate additives. The polymer is processed similarly to Example 1, and tested according to the conditions and parameters of Example 1. The elongation-to-break is 195%, maximum load is 180.6 N (40.6 $lb_f$), and energy-to-break is 5.5 J (48.7 $lb_f$·in.). Results that can be obtained are also summarized in Table 3.

EXAMPLE 7

The P4C5B-076 polypropylene pellets can be thoroughly dry mixed in a bucket with 1% by weight of the hyperbranched polymer HYBRANE® H1500 (DSM N.V.), which contains 8 hydroxyl end group functionalities, and has a molecular weight of about 1,500. The mixture is then processed, and tested according to the conditions and parameters of Example 6. The elongation-to-break is 359%, maximum load is 177.5 N (39.9 $lb_f$), and energy-to-break is 10.0 J (88.7 $lb_f$·in.). This blend exhibits 84% increase in elongation-to-break, 1.7% decrease in maximum load, and 82% increase in energy-to-break, compared to the plain polypropylene P4C5B-076. Results that can be obtained are also summarized in Table 3.

TABLE 3

| Composition | Example # | Elongation-to-break (%) | Maximum Load (N) | Energy-to-break (J) |
| --- | --- | --- | --- | --- |
| Plain PP: P4C5B-076 | 6 | 195 | 180.6 | 5.5 |
| Plain PP + 1% HYBRANE ® H1500 | 7 | 359 | 177.5 | 10.0 |
| Difference from plain PP | | +84% | −1.7% | +82% |
| Strengthening ratio | | 84 | −1.7 | 82 |

EXAMPLE 8

The polyethylene for this Example is the copolymer polyethylene Alathon® H5520 (Equistar Chemicals Inc., Houston, Tex.), serving as a control. This polyethylene has a melt flow index of 20 g/10 min, is processed similarly to Example 1, and tested according to the conditions and parameters of Example 1. The elongation-to-break is 195%, maximum load is 115.2 N (25.9 $lb_f$), and energy-to-break is 4.1 J (36.1 $lb_f$·in.). Results that can be obtained are also summarized in Table 4.

EXAMPLE 9

The Alathon® H5520 polyethylene pellets can be thoroughly dry mixed in a bucket with 1% by weight of the hyperbranched polymer BOLTORN® H40, which contains 64 hydroxyl end group functionalities, and has a molecular weight of about 5,100. The mixture is then processed, and tested according to the conditions and parameters of Example 8. The elongation-to-break is 273%, maximum load is 116.5 N (26.2 $lb_f$), and energy-to-break is 5.8 J (51.5 $lb_f$·in.). This blend exhibits 40% increase in elongation-to-break, 1.0% increase in maximum load, and 41% increase in energy-to-break, compared to the plain polyethylene. Results that can be obtained are also summarized in Table 4.

TABLE 4

| Composition | Example # | Elongation-to-break (%) | Maximum Load (N) | Energy-to-break (J) |
| --- | --- | --- | --- | --- |
| Plain PP: Alathon ® H5520 | 8 | 195 | 115.2 | 4.1 |
| Plain PE + 1% BOLTORN ® H40 | 9 | 273 | 116.5 | 5.8 |
| Difference from plain PE | | +40% | +1% | +41% |
| Strengthening ratio | | 40 | 1 | 41 |

EXAMPLE 10

The polypropylene for this Example is the homopolymer polypropylene H200NS (Huntsman Corp.), serving as a control. This polypropylene is nucleated, its melt flow index is 20 g/10 min, and contains between 0.1% and 5% stearate additives. The polymer is processed similarly to Example 1, and tested according to the conditions and parameters of Example 1. The elongation-to-break is 125%, maximum load is 179.7 N (40.4 $lb_f$), and energy-to-break is 3.7 J (32.8 $lb_f$·in.). Results that can be obtained are also summarized in Table 5.

EXAMPLE 11

The H200NS polypropylene pellets are thoroughly dry mixed in a bucket with 0.1% by weight of the hyperbranched polymer BOLTORN® H40 (Perstorp AB), which contains 64 hydroxyl end group functionalities, and has a molecular weight of about 5,100. The mixture is then processed, and tested according to the conditions and parameters of Example 10. The elongation-to-break is 148%, maximum load is 173.5 N (39.0 $lb_f$), and energy-to-break is 4.3 J (38.0 $lb_f$·in.). This blend exhibits 18.4% increase in elongation-to-break, 3.5% decrease in maximum load, and 16.2% increase in energy-to-break, compared to the plain polypropylene H200NS. Results that can be obtained are also summarized in Table 5.

EXAMPLE 12

The H200NS polypropylene pellets are thoroughly dry mixed in a bucket with 0.5% by weight of the hyperbranched polymer BOLTORN® H40 (Perstorp AB), which contains 64 hydroxyl end group functionalities, and has a molecular weight of about 5,100. The mixture is then processed, and tested according to the conditions and parameters of Example 10. The elongation-to-break is 204%, maximum load is 173.0 N (38.9 $lb_f$), and energy-to-break is 5.8 J (51.3 $lb_f$·in.). This blend exhibits 63.2% increase in elongation-to-break, 3.7% decrease in maximum load, and 56.8% increase in energy-to-break, compared to the plain polypropylene H200NS. Results that can be obtained are also summarized in Table 5.

EXAMPLE 13

The H200NS polypropylene pellets are thoroughly dry mixed in a bucket with 1% by weight of the hyperbranched polymer BOLTORN® H40 (Perstorp AB), which contains 64 hydroxyl end group functionalities, and has a molecular weight of about 5,100. The mixture is then processed, and tested according to the conditions and parameters of Example 10. The elongation-to-break is 489%, maximum load is 179.3.0 N (40.3 lb$_f$), and energy-to-break is 15.3 J (135.3 lb$_f$in.). This blend exhibits 291% increase in elongation-to-break, no substantial difference in maximum load, and 314% increase in energy-to-break, compared to the plain polypropylene H200NS. Results that can be obtained are also summarized in Table 5.

TABLE 5

| Composition | Example # | Elongation-to-break (%) | Maximum Load (N) | Energy-to-break (J) |
|---|---|---|---|---|
| Plain PP: H200NS | 10 | 125 | 179.7 | 3.7 |
| Plain PP + 0.1% BOLTORN ® H40 | 11 | 148 | 173.5 | 4.3 |
| Difference from plain PP | | +18.4% | −3.5% | +16.2% |
| Strengthening ratio | | 184 | −35 | 162 |
| Plain PP + 0.5% BOLTORN ® H40 | 12 | 204 | 173.0 | 5.8 |
| Difference from plain PP | | +63.2% | −3.7% | +56.8% |
| Strengthening ratio | | 126 | −7.5 | 114 |
| Plain PP + 1.0% BOLTORN ® H40 | 13 | 489 | 179.3 | 15.3 |
| Difference from plain PP | | +291% | 0% | +314% |
| Strengthening ratio | | 291 | 0 | 314 |

The embodiments described herein illustrate the principles of the invention and its practical application to thereby enable one of ordinary skill in the art to utilize the invention in various embodiments and with various modifications as can be suited to the particular use contemplated. All such modifications and variations are intended to be within the scope of the invention as determined by the appended claims when interpreted in accordance with the breadth to which they can be fairly, legally and equitably entitled.

What is claimed is:

1. A composition comprising a mixture of:
   a) a polyolefin polymer having a melt flow index of about 14 g/10 min or greater;
   b) from about 0.1% to about 10%, by weight of the polyolefin polymer, of a hyperbranched polymer, said hyperbranched polymer not being covalently bonded to said polyolefin polymer; and
   c) from about 0.01% to about 10%, by weight of the polyolefin polymer, of an ester additive;
wherein said mixture has a tensile energy-to-break value of at least about 15% greater than the tensile energy-to-break value of said polyolefin polymer.

2. The composition of claim 1 wherein said polyolefin is selected from the group consisting of a polypropylene, polyethylene, polybutylene, polymethylpentene, and mixtures thereof.

3. The composition of claim 2 wherein said polyethylene is selected from the group consisting of a low-density polyethylene, high-density polyethylene, linear low-density polyethylene, ultra high molecular weight polyethylene, metallocene polyethylene, cross-linked polyethylene, ethylene-vinylacetate copolymer, ethylene-vinylalcohol copolymer, ethylene ethylacrylate copolymer, ethylene methylacrylate copolymer, ethylene acrylic acid copolymers, ethylene methacrylic acid copolymer, ionomer, ethylene-propylene copolymer, ethylene propylene rubber, chlorinated polyethylene, chlorosulfonated polyethylene, and mixtures thereof.

4. The composition of claim 2 wherein said polypropylene is selected from the group consisting of a homopolymer polypropylene, copolymer polypropylene, and mixtures thereof.

5. The composition of claim 1 wherein said hyperbranched polymer comprises:
   a) a nucleus monomer unit derived from a monomer having the formula $Y(A)_n$ wherein Y is carbon, an aliphatic group, an alicyclic group, a heterocyclic group, or an aromatic group; each A independently being a functional group; and n is an integer of 1 or greater, provided that when n is 1, A is a functional group capable of covalently bonding with two or more other functional groups;
   b) chain extender monomer units covalently bonded to the nucleus monomer unit or to other of said chain extender monomer units, said chain extender monomer units being derived from monomers having the structure $Z(A_x)(B)$, wherein: each Z independently is a carbon, an aliphatic group, an alicyclic group, a heterocyclic group, or an aromatic group; x is an integer from 1 to 4, inclusive; each A independently is a functional group; and each B independently is a functional group that reacts with an A; provided that when x is 1, A is a functional group capable of covalently bonding with two or more functional groups.

6. The composition of claim 1 wherein said ester additive is selected from the group consisting of glyceryl esters, carboxylic acid esters, metallic esters, and mixtures thereof.

7. The composition of claim 6 wherein said ester additive is selected from the group consisting of glyceryl monostearate, calcium stearate, and mixtures thereof.

8. The composition of claim 1 wherein said ester additive is an antistatic agent.

9. The composition of claim 1 wherein said hyperbranched polymer comprises a number of generations of branches of chain extender monomer units forming branched chains, and wherein:
   a) said branched chains are selected from polyester, polypropylene imine, polyesteramide, polyamido amine, polyamide, or mixtures thereof,
   b) the number of said generations of branches per molecule is from 1 to about 10,
   c) the number of said end groups functionalities per molecule is about 1,024 or less, and
   d) the molecular weight of said hyperbranched polymer is from about 200 to about 300,000.

10. The composition of claim 1 wherein said mixture comprises:
    a) from about 0.5% to about 5%, by weight of said polyolefin polymer, of said hyperbranched polymer; and
    b) from about 0.015% and about 2%, by weight of the polyolefin polymer, of said ester additive;
wherein said polyolefin polymer has a melt flow index of about 17 g/10 min or greater and said mixture has a tensile energy-to-break value from about 25% to about 350% greater than the tensile energy-to-break value of said polyolefin polymer.

11. The composition of claim 10 wherein said polyolefin is a polypropylene.

12. The composition of claim 10 wherein said hyperbranched polymer comprises a number of generations of branches of chain extender monomers units forming branched chains, and a number of end group functionalities, wherein:
  a) said branched chains are selected from the group consisting of polyester, polypropylene imine, polyesteramide, polyamido amine, polyamide, and mixtures thereof,
  b) the number of said generations of branches per molecule is from 1 to about 8,
  c) the number of said end groups functionalities per molecule is 256 or less,
  d) said end group functionalities are selected from the group consisting of allylethers, hydroxyls, amines, epoxies, esters, imines, and mixtures thereof, and
  e) the molecular weight of said hyperbranched polymer is from about 300 to about 100,000.

13. The composition of claim 10 wherein said ester additive is selected from the group consisting of glyceryl esters, fatty acid esters, metallic esters, and mixtures thereof.

14. The composition of claim 1 wherein said mixture comprises:
  a) from about 1% to about 3%, by weight of the polyolefin polymer, of said hyperbranched polymer; and
  b) from about 0.02% and about 1% by weight of the polyolefin polymer, of said ester additive;
wherein said polyolefin has a melt flow index of about 20 g/10 min or greater and said mixture has a tensile energy-to-break value from about 40% to about 250% greater than the tensile energy-to-break value of said polyolefin polymer.

15. The composition of claim 14 wherein said polyolefin is a polypropylene.

16. The composition of claim 14 wherein said hyperbranched polymer comprises a number of generations of branches forming branched chains, and a number of end group functionalities, and wherein:
  a) said branched chains are selected from the group consisting of polyester, polypropylene imine, polyesteramide, and mixtures thereof,
  b) the number of said generations of branches per molecule is from 1 to about 6,
  c) the number of said end groups functionalities per molecule is 256 or less,
  d) said end group functionalities are selected from the group consisting of allylethers, hydroxyls, amines, and mixtures thereof, and
  e) the molecular weight of said hyperbranched polymer is from about 1,000 to about 20,000.

17. The composition of claim 1, wherein:
  a) said polyolefin polymer is a polyethylene, nucleated polypropylene, or mixture thereof, having a melt flow index of about 20 g/10 min or greater,
  b) said composition comprises from about 0.02% to about 5%, by weight of said polyolefin polymer, of said ester additive, and from about 1% to about 3%, by weight of said polyolefin polymer, of said hyperbranched polymer;
  c) said hyperbranched polymer contains about 256 or less hydroxyl end group functionalities per molecule, and
  d) said composition has a tensile energy-to-break value from about 40% to about 250% greater than the tensile energy-to-break value of said nucleated polypropylene.

18. A composition as in claim 17 wherein said composition comprises between about 0.02% and about 1%, by weight of said polyolefin polymer, of said ester additive, and said ester additive comprises glyceryl monostearate, calcium stearate, or a mixture thereof.

19. A composition comprising a mixture of:
  a) a polyolefin polymer having a melt flow index of about 14 g/10 min or greater; and
  b) from about 0.1% to about 10%, by weight of the polyolefin polymer, of a hyperbranched polymer, said hyperbranched polymer not being covalently bonded to said polyolefin polymer;
wherein said mixture has a tensile energy-to-break value of at least about 15% greater than the tensile energy-to-break value of said polyolefin polymer.

20. A method for making a polymer composition comprising the steps of:
  a) providing a mixture of:
    i) a polyolefin polymer having a melt flow index of about 14 g/10 min or greater;
    ii) from about 0.1% to about 10%, by weight of the polyolefin polymer, of a hyperbranched polymer; and
    iii) from about 0.01% to about 10%, by weight of the polyolefin polymer, of an ester additive; and
  b) processing said mixture to form a polymer product;
wherein said hyperbranched polymer is not covalently bonded to said polyolefin polymer said mixture has a tensile energy-to-break value of at least about 15% greater than the tensile energy-to-break value of said polyolefin polymer.

* * * * *

UNITED STATES PATENT AND TRADEMARK OFFICE
CERTIFICATE OF CORRECTION

PATENT NO. : 6,673,870 B2  
APPLICATION NO. : 10/144401  
DATED : January 6, 2004  
INVENTOR(S) : Blair Alex Owens et al.

Page 1 of 1

It is certified that error appears in the above-identified patent and that said Letters Patent is hereby corrected as shown below:

Column 3  
Line 45, please insert -- it -- between "Unexpectedly" and "has".  
Column 4  
Line 66, please delete "polyomers" and insert therefor -- polymers --.  
Line 66, please delete "polyodispersed" and insert therefor -- polydispersed --.  
Column 5  
Line 2, please delete "polyomeric" and insert therefor -- polymeric --.  
Lines 3 and 10, please delete "polyodispersed" and insert therefor -- polydispersed --.  
Lines 4, 7 and 11, please delete "polyomers" and insert therefor -- polymers --.  
Lines 46 and 53, please delete "nitrites" and insert therefor -- nitriles --.  
Line 64, please delete the period "." after the "A" between "number of" and "functional groups".  
Column 6  
Line 12, please delete "An" and insert therefor -- $A_n$ --.  
Column 7  
Line 14, please delete "polyomers" and insert therefor -- polymers --.  
Column 8  
Lines 38-39, please delete "Nonfunctional" and insert therefor -- monfunctional --.  
Column 10  
Line 25, please delete the period "." between "known" and "additive".  
Column 11  
Line 46, please insert -- zone 5 at 220° C., --.  
Column 14  
In the first line of Table 4, please delete "PP" and insert therefor -- PE --.

Signed and Sealed this

Eighteenth Day of November, 2008

JON W. DUDAS  
*Director of the United States Patent and Trademark Office*